United States Patent
Lentine

(10) Patent No.: US 9,869,459 B2
(45) Date of Patent: Jan. 16, 2018

(54) LANDSCAPE LIGHT

(71) Applicant: Telebrands Corp., Fairfield, NJ (US)

(72) Inventor: Lou Lentine, Chattanooga, TN (US)

(73) Assignee: Telebrands Corp., Fairfield, NJ (US)

( * ) Notice: Subject to any disclaimer, the term of this patent is extended or adjusted under 35 U.S.C. 154(b) by 0 days.

(21) Appl. No.: 15/280,315

(22) Filed: Sep. 29, 2016

(65) Prior Publication Data

US 2017/0045208 A1 Feb. 16, 2017

Related U.S. Application Data

(63) Continuation of application No. 15/142,789, filed on Apr. 29, 2016, which is a continuation of application
(Continued)

(51) Int. Cl.
*F21V 21/08* (2006.01)
*F21V 5/04* (2006.01)
(Continued)

(52) U.S. Cl.
CPC .......... *F21V 21/0824* (2013.01); *F21S 10/06* (2013.01); *F21V 5/04* (2013.01); *F21V 21/30* (2013.01); *F21V 23/001* (2013.01); *F21V 23/0407* (2013.01); *G02B 5/0252* (2013.01); *H05B 37/0281* (2013.01); *F21S 9/03* (2013.01); *F21S 10/007* (2013.01); *F21S 10/023* (2013.01); *F21V 23/0435* (2013.01); *F21V 23/0471* (2013.01);
(Continued)

(58) Field of Classification Search
CPC .... F21V 21/0824; F21V 23/0407; F21V 5/04; F21V 23/0435; F21V 23/001; F21W 2131/10
See application file for complete search history.

(56) References Cited

U.S. PATENT DOCUMENTS 1,196,951 A 9/1916 Hawthorne
D56,256 S 9/1920 Ryder
(Continued)

FOREIGN PATENT DOCUMENTS

CN 2743676 11/2005
CN 201173996 12/2008
(Continued)

OTHER PUBLICATIONS

Laser Light, available at www.amazon.com, accessed on Nov. 13, 2015.
(Continued)

*Primary Examiner* — Donald Raleigh
*Assistant Examiner* — Kevin Quarterman
(74) *Attorney, Agent, or Firm* — Cooper & Dunham, LLP

(57) ABSTRACT

A landscape light including a first laser light source having a first lens and producing a first laser light having a first color, the first lens configured to disperse the first laser light, a second laser light source having a second lens and producing a second laser light having a second color, the second lens configured to disperse the second laser light, and a spotlight producing a background light such that the dispersed first and second laser lights are projected substantially within the background light produced by the spotlight.

26 Claims, 8 Drawing Sheets

Related U.S. Application Data

No. 14/801,458, filed on Jul. 16, 2015, now abandoned.

(60) Provisional application No. 62/025,344, filed on Jul. 6, 2014.

(51) Int. Cl.

| | | |
|---|---|---|
| *H05B 37/02* | (2006.01) | |
| *G02B 5/02* | (2006.01) | |
| *F21V 23/00* | (2015.01) | |
| *F21S 10/06* | (2006.01) | |
| *F21V 21/30* | (2006.01) | |
| F21V 23/04 | (2006.01) | |
| F21V 33/00 | (2006.01) | |
| F21Y 113/13 | (2016.01) | |
| F21W 131/10 | (2006.01) | |
| F21S 9/03 | (2006.01) | |
| F21S 10/00 | (2006.01) | |
| F21W 131/109 | (2006.01) | |
| F21S 10/02 | (2006.01) | |

(52) U.S. Cl.
CPC ...... *F21V 33/0052* (2013.01); *F21W 2131/10* (2013.01); *F21W 2131/109* (2013.01); *F21Y 2113/13* (2016.08)

(56) References Cited

U.S. PATENT DOCUMENTS

| | | |
|---|---|---|
| D56,257 S | 9/1920 | Ryder |
| D56,258 S | 9/1920 | Ryder |
| D58,676 S | 8/1921 | Macneale |
| D70,236 S | 5/1926 | Meden |
| D173,139 S | 10/1954 | Black |
| 3,104,064 A | 9/1963 | Bellek |
| 3,442,572 A | 5/1969 | Illsley |
| D231,559 S | 4/1974 | Darling |
| 3,822,930 A | 7/1974 | Douklias |
| D233,778 S | 11/1974 | Kennedy |
| D233,779 S | 11/1974 | Kennedy |
| D234,710 S | 4/1975 | Beeren |
| 3,944,761 A | 3/1976 | Nicholl |
| 4,114,112 A | 9/1978 | Epstein |
| D254,154 S | 2/1980 | Young |
| 4,217,040 A | 8/1980 | Longerbeam |
| 4,307,528 A | 12/1981 | Dewees |
| 4,458,124 A | 7/1984 | Kroth |
| D278,215 S | 4/1985 | Patterson |
| 4,557,055 A | 12/1985 | Arai |
| D282,104 S | 1/1986 | Taylor |
| D286,682 S | 11/1986 | Greenlee |
| 4,779,176 A | 10/1988 | Bornhorst |
| 4,814,961 A | 3/1989 | O'Brien |
| 5,036,447 A | 7/1991 | Taylor |
| D323,406 S | 1/1992 | Fisher |
| 5,086,379 A | 2/1992 | Denison |
| 5,090,789 A | 2/1992 | Crabtree |
| D326,162 S | 5/1992 | Price |
| D328,147 S | 7/1992 | Gecchelin |
| D333,526 S | 2/1993 | Taylor |
| D333,529 S | 2/1993 | Denison |
| 5,226,104 A | 7/1993 | Unterleitner |
| D340,305 S | 10/1993 | Hall |
| 5,280,417 A | 1/1994 | Hall |
| 5,367,349 A | 11/1994 | Zeiler |
| 5,398,180 A | 3/1995 | Lee |
| D361,149 S | 8/1995 | Wedell |
| 5,459,539 A | 10/1995 | Yamamoto |
| D365,169 S | 12/1995 | Fillipp |
| D370,070 S | 5/1996 | Kay |
| 5,517,264 A | 5/1996 | Sutton |
| 5,613,799 A | 3/1997 | Guide |
| 5,626,418 A | 5/1997 | Angelis |
| 5,649,760 A | 7/1997 | Beadle |
| D383,236 S | 9/1997 | Krogman |
| D389,935 S | 1/1998 | Pink |
| 5,709,462 A | 1/1998 | Rumpel |
| D397,490 S | 8/1998 | Lecluze |
| 5,824,981 A | 10/1998 | Suzuki |
| 5,882,107 A | 3/1999 | Bornhorst |
| D410,295 S | 5/1999 | Lueken |
| D413,996 S | 9/1999 | Andrus |
| D414,579 S | 9/1999 | Denison |
| 5,971,545 A | 10/1999 | Haitz |
| 6,000,813 A | 12/1999 | Krietzman |
| D427,696 S | 7/2000 | Scott |
| 6,145,228 A | 11/2000 | LaChance |
| 6,152,577 A | 11/2000 | Rizkin |
| D437,071 S | 1/2001 | Andrus |
| D437,652 S | 2/2001 | Uhler |
| D438,322 S | 2/2001 | Skradski |
| 6,190,025 B1 | 2/2001 | Solinsky |
| D438,999 S | 3/2001 | Bossy |
| 6,304,237 B1 | 10/2001 | Karakawa |
| 6,474,837 B1 | 11/2002 | Belliveau |
| 6,553,175 B2 | 4/2003 | Jaspan |
| 6,594,090 B2 | 7/2003 | Kruschwitz et al. |
| D482,476 S | 11/2003 | Kwong |
| 6,644,839 B2 | 11/2003 | Lee |
| 6,655,817 B2 | 12/2003 | Devlin |
| 6,695,452 B2 | 2/2004 | Panasewicz |
| 6,722,771 B1 | 4/2004 | Stephens |
| 6,802,630 B2 | 10/2004 | Doppelt |
| 6,874,893 B2 | 4/2005 | Park |
| D506,282 S | 6/2005 | Benghozi |
| D506,283 S | 6/2005 | Benghozi |
| 7,040,780 B2 | 5/2006 | Diehl |
| 7,137,721 B1 | 11/2006 | Rao |
| 7,175,321 B1 | 2/2007 | Lopez |
| D538,959 S | 3/2007 | Kosche |
| D541,456 S | 4/2007 | Kosche |
| D541,966 S | 5/2007 | Bhengozi |
| D542,959 S | 5/2007 | Yao |
| 7,257,551 B2 | 8/2007 | Oskorep |
| D550,877 S | 9/2007 | Mullen |
| D551,789 S | 9/2007 | Mullen |
| 7,369,584 B2 | 5/2008 | Goldman |
| 7,380,956 B2 | 6/2008 | Richmond |
| D574,104 S | 7/2008 | Sanoner |
| D574,532 S | 8/2008 | Lee |
| 7,418,016 B2 | 8/2008 | Gruhlke et al. |
| D577,453 S | 9/2008 | Metlen |
| D589,191 S | 3/2009 | Sabernig |
| 7,534,975 B1 | 5/2009 | Sharrah |
| 7,547,111 B2 | 6/2009 | Richmond et al. |
| D604,880 S | 11/2009 | Lovegrove |
| D604,882 S | 11/2009 | Mier-Langner |
| RE41,050 E | 12/2009 | Panasewicz |
| D605,325 S | 12/2009 | Sanoner |
| 7,641,345 B2 | 1/2010 | Johnson |
| D615,688 S | 5/2010 | Chen |
| D616,586 S | 5/2010 | Sabernig |
| D619,289 S | 7/2010 | You |
| D619,290 S | 7/2010 | You |
| D625,871 S | 10/2010 | Huang |
| D628,329 S | 11/2010 | Tuli |
| 7,832,918 B2 | 11/2010 | Chien |
| D632,414 S | 2/2011 | Croce |
| D638,159 S | 5/2011 | Yao |
| 7,993,040 B2 | 8/2011 | Beadle |
| 8,003,886 B1 | 8/2011 | Rintz |
| D647,234 S | 10/2011 | Izardel |
| D647,657 S | 10/2011 | Janssen |
| D649,671 S | 11/2011 | Ferro |
| 8,057,045 B2 | 11/2011 | Johnson |
| D651,335 S | 12/2011 | Chen |
| 8,100,537 B2 | 1/2012 | Johnson |
| 8,100,538 B2 | 1/2012 | Kuroda |
| D654,207 S | 2/2012 | Fletcher |
| D654,214 S | 2/2012 | Huang |
| D654,606 S | 2/2012 | Chen |

(56) References Cited

U.S. PATENT DOCUMENTS

| | | |
|---|---|---|
| D656,821 S | 4/2012 | Marcoux |
| D659,871 S | 5/2012 | Lee |
| 8,251,521 B2 | 8/2012 | Mizushima et al. |
| D667,981 S | 9/2012 | Connolly |
| D667,989 S | 9/2012 | May |
| 8,297,825 B2 | 10/2012 | Onishi |
| 8,303,129 B1 | 11/2012 | Thielen |
| 8,303,150 B2 | 11/2012 | Chien |
| 8,366,281 B2 | 2/2013 | Silverstein et al. |
| 8,366,292 B2 | 2/2013 | McDermott |
| 8,376,574 B2 | 2/2013 | Spartano |
| 8,436,553 B2 | 5/2013 | Zampini |
| 8,480,233 B2 | 7/2013 | Smith |
| 8,485,686 B2 | 7/2013 | Swan |
| 8,511,877 B2 | 8/2013 | Chien |
| 8,693,513 B2 | 4/2014 | Achtenhagen |
| 8,721,160 B2 | 5/2014 | Chien |
| 8,834,009 B2 | 9/2014 | Chien |
| 8,901,827 B1 | 12/2014 | Xu |
| D723,726 S | 3/2015 | Reed |
| D738,023 S | 9/2015 | Rosello Gratacos |
| 9,157,589 B2 | 10/2015 | Chien |
| 9,200,790 B2 | 12/2015 | Lien et al. |
| D747,525 S | 1/2016 | Guercio |
| D748,838 S | 2/2016 | Brynjolfsson |
| D764,694 S | 8/2016 | Tsai |
| D765,906 S | 9/2016 | Khubani |
| D766,483 S | 9/2016 | Khubani |
| D766,484 S | 9/2016 | Khubani |
| 9,458,994 B1 | 10/2016 | Khubani |
| D777,965 S | 1/2017 | Mirchandani |
| 9,546,775 B1 | 1/2017 | Khubani |
| D778,478 S | 2/2017 | Khubani |
| D779,098 S | 2/2017 | Tsai |
| 9,562,673 B1 | 2/2017 | Khubani |
| 9,719,654 B2 | 8/2017 | Chien |
| 2002/0101571 A1 | 8/2002 | Panasewicz |
| 2003/0189825 A1 | 10/2003 | Tauch |
| 2004/0042070 A1 | 3/2004 | Yagi |
| 2004/0119951 A1 | 6/2004 | Vitantonio |
| 2004/0141316 A1 | 7/2004 | Twardawski |
| 2005/0024863 A1 | 2/2005 | Phipps |
| 2005/0243560 A1 | 11/2005 | Chen |
| 2006/0158138 A1 | 7/2006 | Walter |
| 2006/0198153 A1 | 9/2006 | Chien |
| 2007/0064290 A1 | 3/2007 | Hochenbleicher |
| 2008/0224849 A1* | 9/2008 | Sirhan ............... F21V 23/0442 340/521 |
| 2008/0316732 A1 | 12/2008 | Blake |
| 2009/0027900 A1* | 1/2009 | Janos ............... F21V 21/0824 362/373 |
| 2009/0033814 A1 | 2/2009 | Khan |
| 2009/0067191 A1 | 3/2009 | Faber |
| 2009/0122564 A1 | 5/2009 | Beadle |
| 2009/0168026 A1 | 7/2009 | Chen |
| 2009/0185377 A1* | 7/2009 | Johnson ............. F21V 21/0824 362/259 |
| 2009/0268121 A1 | 10/2009 | Hisada |
| 2010/0046211 A1 | 2/2010 | Spartano |
| 2010/0053969 A1 | 3/2010 | Weinheimer |
| 2012/0176782 A1 | 7/2012 | Vanderschuit |
| 2012/0188754 A1 | 7/2012 | Fitzwater |
| 2012/0257418 A1 | 10/2012 | Fields et al. |
| 2012/0324772 A1 | 12/2012 | Gingerella |
| 2013/0088152 A1 | 4/2013 | Hagen |
| 2013/0088723 A1 | 4/2013 | Feldkhun |
| 2013/0257297 A1 | 10/2013 | Schmidt |
| 2014/0036487 A1 | 2/2014 | Adams |
| 2014/0268703 A1 | 9/2014 | Ehlert |
| 2014/0313779 A1 | 10/2014 | Higgins et al. |
| 2014/0328060 A1 | 11/2014 | Gadegaard |
| 2014/0335910 A1 | 11/2014 | Wang |
| 2015/0035437 A1 | 2/2015 | Panopoulos |
| 2015/0070897 A1 | 3/2015 | Chien |
| 2015/0159842 A1 | 6/2015 | Zhang |
| 2015/0260385 A1* | 9/2015 | Brynjolfsson ........ F21V 23/045 315/152 |
| 2015/0308655 A1 | 10/2015 | Holmes |
| 2016/0238221 A1 | 8/2016 | Lentine |
| 2016/0313089 A1 | 10/2016 | Collin |
| 2016/0369996 A1 | 12/2016 | Qin |
| 2017/0045212 A1 | 2/2017 | Ghasabi |
| 2017/0080991 A1 | 3/2017 | White |

FOREIGN PATENT DOCUMENTS

| | | |
|---|---|---|
| CN | 201407589 Y | 2/2010 |
| CN | 202091917 | 12/2011 |
| CN | 101276523 A | 8/2012 |
| CN | 102620220 | 8/2012 |
| CN | 102809110 | 12/2012 |
| CN | 202140959 | 12/2012 |
| CN | 202691883 | 1/2013 |
| CN | 202972915 | 6/2013 |
| CN | 203273720 | 11/2013 |
| CN | 203431698 | 2/2014 |
| CN | 203453930 | 2/2014 |
| CN | 204083891 | 1/2015 |
| CN | 204141534 | 2/2015 |
| CN | 204176560 | 2/2015 |
| CN | 204240200 | 4/2015 |
| CN | 204268353 | 4/2015 |
| CN | 303234579 S | 6/2015 |
| CN | 104812342 | 7/2015 |
| CN | 204621354 | 9/2015 |
| CN | 204629169 U | 9/2015 |
| CN | 105068243 | 11/2015 |
| CN | 205155727 | 4/2016 |
| CN | 303657559 | 4/2016 |
| DE | 2740191 | 3/1979 |
| DE | 202006003915 | 5/2006 |
| DE | 20 2007 009 156 U1 | 1/2008 |
| DE | 202006009535 | 8/2008 |
| EP | 1 024 399 | 2/2000 |
| GB | 2435090 | 8/2007 |
| JP | H07227342 | 8/1995 |
| KR | 20120023293 | 3/2013 |
| WO | WO 2006/074205 | 7/2006 |
| WO | WO 2010022367 | 2/2010 |
| WO | WO 2012002833 | 1/2012 |
| WO | WO 2015/094009 | 6/2015 |
| WO | WO 2015/138480 | 9/2015 |
| WO | WO 2015/143450 | 9/2015 |
| WO | WO 2015/149877 | 10/2015 |

OTHER PUBLICATIONS

Night Stars, available at www.amazon.com, accessed Nov. 13, 2015.

Poeland Garden Laser Landscape, available at www.amazon.com, accessed Nov. 13, 2015.

Remote Controllable RGB Laser, available at www.amazon.com, accessed Nov. 13, 2015.

Newest Garden Tree and Outdoor Wall Decoration Laser, available at www.amazon.com, accessed Nov. 13, 2015.

Pepnice Red and Green Firefly Laser Light, available at www.amazon.com, accessed Nov. 13, 2015.

KLAREN Color Laser Light Projector, available at www.amazon.com, accessed Nov. 13, 2015.

Garden Tree and Outdoor Wall Decoration Laser Lights for Holiday Lighting, available at www.amazon.com, accessed Nov. 13, 2015.

Green and Red Light Garden Tree and Outdoor Wall Decoration Laser Lights, available at www.amazon.com, accessed Nov. 13, 2015.

Moving RED and Green 2 Color Laser Landscape Projector Light w/ Remote, available at www.amazon.com, accessed Nov. 13, 2015.

Examination Report of Application No. 2016101293 by IP Australia, issued Oct. 20, 2016.

Laser Christmas Lights & Outdoor Laser Lights, published Oct. 6, 2015, available at http://web.archive.org/web/20151006140058/http://www.laserchristmaslights.com.

(56) References Cited

OTHER PUBLICATIONS

Examination Report of Application No. 2016101295 by IP Australia, issued Oct. 20, 2016.
Written Opinion of International Search Authority PCT/US2016/021345, published Sep. 1, 2016.
International Search Report PCT/US2016/021345, published Sep. 1, 2016.
Extended European Search Report of Application No. 16197893 by European Patent Office, issued Feb. 24, 2017.
Extended European Search Report of Application No. 16197896 by European Patent Office, issued Mar. 13, 2017.
SeresRoad Outdoor Waterproof Star Projector, Landscape Projector, available at www.amazon.com, accessed on Nov. 13, 2015.
Us-vision AGO-2ORG Modern Outdoor/ Indoor 20 Patterns Gobos Rg Laser Projector, available at www.amazon.com, accessed Nov. 13, 2015.
Sminiker Outdoor Laser Light Sparkle Magic Lights Landscape Light Holiday Light, available at www.amazon.com, accessed Nov. 13, 2015.
Us-vision Outdoor Holiday Waterproof Green Laser Lighting Show, available at www.amazon.com, accessed Nov. 13, 2015.
Improvements All-metal 4-in-1 Projection Light with Remote, available at www.amazon.com, accessed Nov. 13, 2015.
KLAREN Color Laser Light Projector—Improvements, available at www.amazon.com, accessed Nov. 13, 2015.
Light Flurries, available at www.lightflurries.com, accessed Mar. 17, 2016.
Outdoor Indoor Spright Smart Firefly Light with Timer Green, available at www.amazon.com, accessed May 2, 2016.
Blisslights Spright Spring Smart Outdoor Indoor Firefly Light Projector with Timer, available at www.amazon.com, accessed May 2, 2016.
Mr. Christmas Super Green Laser Light Show, available at www.amazon.com, accessed May 2, 2016.
BlissLights Motion Laser, available at www.amazon.com, accessed May 2, 2016.
Color Laser Lights Instructions, published 2014.
BlissLights Spright Smart User Guide, published 2014.
Written Opinion of International Search Authority PCT/US2016/021354, published Jun. 30, 2016.
International Search Report PCT/US2016/021354, published Jun. 30, 2016.
International Search Report PCT/US2016/021347, published May 17, 2016.
Written Opinion of International Search Authority PCT/US2016/021347, published May 17, 2016.
International Search Report PCT/US2016/021338, published May 16, 2016.
Written Opinion of International Search Authority PCT/US2016/021338, published May 16, 2016.
Peatross, Physics of Light and Optics, Mar. 22, 2017, pp. 288-295, 303.
Examination Report of Application No. 2016101293 by IP Australia, issued Feb. 17, 2017.
Extended European Search Report of Application No. 16197894.5-1568 by European Patent Office, issued Feb. 17, 2017.
Office Action of Application No. 2,937,150 by Canadian Intellectual Property Office, issued Jan. 26, 2017.
Laser Projector Yard Stake Sell Sheet by YFC-BonEagle, Copyright 2011.
Consumer Electronics Show Flyer by Prime, Jan. 2014.
Laser Light Prime, https://www.youtube.com/watch?v=ygPEISRdaRo, accessed May 25, 2017, published Nov. 29, 2014.
Extended European Search Report of Application No. 16197895 by European Patent Office, dated Apr. 28, 2017.
Declaration of Stephen D. Fantone dated Jul. 3, 2017, submitted in support of response to Order to Show Cause (Civil Action No. 2:17-cv-02878).
Everstar Merchandising Product No. 88-506.
Everstar Merchandising Product No. 68-005 (US)/88-653 (CAN).
Request for Ex Parte Reexamination of U.S. Pat. No. 9,546,775, dated Jul. 13, 2017.
Office Action of Application No. 2,937,150 by Canadian Intellectual Property Office, dated Jun. 30, 2017.
Examination Report of Application No. 2017100480 by IP Australia, dated Jun. 8, 2017.
Office Action of Application No. 2,965,063 by Canadian Intellectual Property Office, dated Jun. 16, 2017.
Order Granting Ex Parte Reexamination of U.S. Pat. No. 9,546,775, dated Aug. 1, 2017.
Petition For Post Grant Review of U.S. Pat. No. 9,546,775, filed on Oct. 16, 2017.
Slate, "Know Your Fireworks," published Jul. 1, 2011 (Exhibit 1006 to the Petition For Post Grant Review of U.S. Pat. No. 9,546,775, filed Oct. 16, 2017).
Webster's Dictionary, 2014, p. 1527, published by Houghton Mifflin Publishing Co. (Exhibit 1007 to the Petition For Post Grant Review of U.S. Pat. No. 9,546,775, filed on Oct. 16, 2017).
Chauvet, EZMiN User Manual, 2013 (Exhibit 1010 to the Petition For Post Grant Review of U.S. Pat. No. 9,546,775, filed on Oct. 16, 2017).
Thor Labs Drawing for Item No. NDC-100C-2M, drawn on Jun. 22, 2012 (Exhibit 1019 to the Petition For Post Grant Review of U.S. Pat. No. 9,546,775, filed on Oct. 16, 2017).
Evaluation Report of Utility Model Patent CN 2016208941741, dated Aug. 3, 2017.
Bliss Lights Spright User's Guide, published online at http:/www.blisslights.com/data/store/tabs/53a0cd9a6c00b.pdf at least as early as Jun. 27, 2014.
Petition For Post Grant Review of U.S. Pat. No. 9,752,761, filed Nov. 27, 2017.
Request for Ex Parte Reexamination of U.S. Pat. No. 9,752,761, dated Nov. 6, 2017.
Order Granting Ex Parte Reexamination of U.S. Pat. No. 9,752,761, dated Aug. 1, 2017.
Color Laser Light Instructions, U.S. Appl. No. 62/025,344 (filed Jul. 16, 2014) (Exhibit 1003 to the Petition For Post Grant Review of U.S Pat. No. 9,752,761, filed Nov. 27, 2017).
Sliney, Safety with Lasers and Other Optical Sources, Ch. 20, p. 625-654, 1980 (Exhibit 1042 to the Petition For PGR of U.S. Pat. No. 9,752,761, filed Nov. 27, 2017).
BlissLights, LLC, BlissLights SPRIGHTsmart User's Guide (Exhibit 1036 to the Petition For PGR of U.S. Pat. No. 9,752,761, filed Nov. 27, 2017).
Prime Wire & Cable, Inc., Packaging Specification: LFLRG505, dated Jan. 29, 2014(Exhibit 1015 to the Petition For PGR of U.S. Pat. No. 9,752,761, filed Nov. 27, 2017).
Food & Drug Administration, Compliance Guide for Laser Products, Jun. 1992 (Exhibit 1040 to the Petition for PGR of U.S. Pat. No. 9,752,761, filed Nov. 27, 2017).
Photographs of Prime Laser Product, Model LFLRG505 (Exhibit 1011 to the Petition For Post Grant Review of U.S. Pat. No. 9,752,761, filed Nov. 27, 2017).
BlissLights, LLC, BlissLights SPRIGHT User's Guide (Exhibit 1032 to the Petition For PGR of U.S. Pat. No. 9,752,761, filed Nov. 27, 2017).
Screen capture from http://web.archive.org/ of lissLights SPRIGHT User's Guide, archived Jul. 16, 2014 (Exhibit 1033 to the PGR Petition of U.S. Pat. No. 9,752,761, filed Nov. 27, 2017).
Prime Wire & Cable, Inc., Laser Light Projector LFLRG505 User Manual (Exhibit 1013 to the Petition For PGR of U.S. Pat. No. 9,752,761, filed Nov. 27, 2017).
Prime Wire & Cable, Inc., Model LFLRG505 Purchase Product Specification, Jun. 24, 2014 (Exhibit 1025 to the Petition For PGR of U.S. Pat. No. 9,752,761, filed Nov. 27, 2017).
Sliney, Laser Safety with Consumer and Office Products, Ch 1, p. 1-11, 1980 (Exhibit 1041 to the Petition For PGR of U.S. Pat. No. 9,752,761, filed Nov. 27, 2017).
D. Hochmuth, Diffractive Optics Give Laser Pointers a New Twist, Photonics Spec. Aug. 1995 (Exhibit 1049 to the Petition For PGR of U.S. Pat. No. 9,752,761, filed Nov. 27, 2017).

(56) References Cited

OTHER PUBLICATIONS

The Paramount Org., Inc., Laser Spectacular, at www.pinkfloydlasershow.com/about, Nov. 7, 2017 (Exhibit 1052 to the PGR Petition of U.S. Pat. No. 9,752,761, filed Nov. 27, 2017).

Wikipedia, Pink Floyd, https://en.wikipedia.org/wiki/Pink_Floyd_live_performances, Nov. 7, 2017 (Exhibit 1053 to the PGR Petition of U.S. Pat. No. 9,752,761, filed Nov. 27, 2017).

BlissLights, LLC, Technology, http;//www.blisslight.com:80/technology, Jun. 27, 2014 (Exhibit 1031 to the Petition For PGR of U.S. Pat. No. 9,752,761, filed Nov. 27, 2017).

Spright Green, http://www.blisslight.com:80/store/products/spright-green/1452, Apr. 1, 2014, (Exh 1030 to the Petition For PGR of U.S. Pat. No. 9,752,761, filed Nov. 27, 2017).

Food & Drug Administration, Ratiation-Emitting Products, Feb. 21, 2014 (Exhibit 1037 to the Petition For PGR of U.S. Pat. No. 9,752,761, filed Nov. 27, 2017).

Herzig, Diffractive Components: Holographic Optical Elements, pp. 43-44, copyrighted 1993 (Exhibit 1051 to the Petition For PGR of U.S. Pat. No. 9,752,761, filed Nov. 27, 2017).

Barat, Laser Safety Management, Chapter 1, pp. 1-13, copyrighted 2006 (Exhibit 1043 to the Petition For PGR of U.S. Pat. No. 9,752,761, filed Nov. 27, 2017).

Barat, Laser Safety Management, Chapter 4, pp. 45-56, copyrighted 2006 (Exhibit 1044 to the Petition For PGR of U.S. Pat. No. 9,752,761, filed Nov. 27, 2017).

Barat, Laser Safety Management, Chapter 11, pp. 159-187, copyrighted 2006 (Exhibit 1045 to the Petition For PGR of U.S. Pat. No. 9,752,761, filed Nov. 27, 2017).

Barat, Laser Safety Management, Chapter 15, pp. 233-239, copyrighted 2006 (Exhibit 1046 to the Petition For PGR of U.S. Pat. No. 9,752,761, filed Nov. 27, 2017).

Barat, Laser Safety Management, Glossary, pp. 241-252, copyrighted 2006 (Exhibit 1047 to the Petition For PGR of U.S. Pat. No. 9,752,761, filed Nov. 27, 2017).

Henderson, Laser Safety, pp. 366-369, copyrighted 2004 (Exhibit 1048 to the Petition For PGR of U.S. Pat. No. 9,752,761, filed Nov. 27, 2017).

Prime Wire & Cable, Inc., Script of Commercial, Mar. 12, 2014 (Exhibit 1018 to the Petition For PGR of U.S. Pat. No. 9,752,761, filed Nov. 27, 2017).

Prime Wire & Cable, Inc., Screen Captures of "Laser Lighth Prime" Commercial, Mar. 12, 2014 (Exhibit 1017 to the Petition For PGR of U.S. Pat. No. 9,752,761, filed Nov. 27, 2017).

* cited by examiner

LANDSCAPE LIGHT

CROSS REFERENCE TO RELATED APPLICATIONS

This application is a continuation-in-part application of U.S. application Ser. No. 15/142,789, filed on Apr. 29, 2016, which is a continuation application of U.S. application Ser. No. 14/801,458, filed on Jul. 16, 2015, which claims the benefit of the U.S. Provisional Patent Application Ser. No. 62/025,344, filed on Jul. 16, 2014. These applications are hereby incorporated by reference in their entireties.

FIELD

The present invention relates generally to lighting devices, and more particularly to an improved landscape lighting apparatus.

BACKGROUND

U.S. Pat. Nos. 7,641,345 and 8,057,045 to Johnson describes a projection apparatus for generating a moving star field and a cloud-like effect comprises a means for generating a cloud-like effect using at least one non-coherent light source, a means for generating a moving star field using at least one coherent light source and a means for regulating and supplying electric power. The means for generating cloud-like effect using at least one non-coherent light source comprises at least one pair of condenser lenses and an interferential filter wheel rotated by a motor, disposed between at least one pair of condenser lenses. The means for generating the moving star field using a coherent light source comprises a grating wheel rotated by a motor and a diffractive optical element disposed between the at least one coherent light source and the grating wheel.

U.S. Pat. No. 8,100,537 to Johnson describes a laser landscape lighting apparatus for use in accent lighting applications for landscapes and outdoor venues. In one embodiment, the laser landscape lighting apparatus includes a coherent light source in combination with a diffractive optical element and optionally a diffraction grating wheel. The diffractive optical element may be, for example, a holographic optical element. In some embodiments, the laser landscape lighting apparatus includes a temperature-controlled integral derivative system. In one application, the laser landscape lighting apparatus may project a static or movable star field.

SUMMARY

Embodiments of the present invention can provide a landscape light. The landscape light can include a first laser light source having a first lens and producing a first laser light having a first color, the first lens configured to disperse the first laser light, a second laser light source having a second lens and producing a second laser light having a second color, the second lens configured to disperse the second laser light, and a spotlight producing a background light such that the dispersed first and second laser lights are projected substantially within the background light produced by the spotlight.

According to certain exemplary embodiments, the landscape light can further include a third laser light source producing a third laser light, where the third laser light has a third color, with the first, second, and third colors being different. The landscape can also include a laser light effect assembly configured to produce at least one visual effect using at least one of the first and the second laser lights. The visual effect can include at least one of a shimmering effect, a flashing effect, a pulsing effect, a strobing effect, a movement, and a pattern.

According to other exemplary embodiments, the landscape light can include a wireless control module configured to provide wireless control of the landscape light, a timer configured to enable control of the landscape light based on operation of the timer, a speaker, and/or a motion sensor configured to enable control of the landscape light based on motion detected by the motion sensor.

Another embodiment of the present invention can provide a landscape light including a laser light source producing a laser light, a pattern assembly including at least one pattern generator secured in a path of the laser light such that the laser light passing through the at least one pattern generator is be projected onto a surface in a pattern defined by the at least one pattern generator, and an articulation assembly configured to articulate the laser light on the surface onto which the laser light is being projected. The landscape light can include a second laser light source having a second lens and producing a second laser light. The second laser light can pass through the at least one pattern generator such that the second laser light is projected onto the surface in the pattern defined by the at least one pattern generator, and the articulation assembly can be further configured to articulate the second laser light on the surface onto which the second laser light is being projected.

According to certain exemplary embodiments, the landscape light can include a spotlight producing a background light such that the laser light is projected substantially within the background light produced by the spotlight. The landscape light can also include a laser light effect assembly configured to produce at least one visual effect using the laser light. The visual effect can include at least one of a flashing effect, a pulsing effect, and a strobing effect.

According to other exemplary embodiments, the landscape light can include a wireless control module configured to provide wireless control of the landscape light, a timer configured to enable control of the landscape light based on operation of the timer, a speaker, and/or a motion sensor configured to enable control of the landscape light based on motion detected by the motion sensor.

According to other exemplary embodiments, the at least one pattern generator can include a plurality of pattern generators, each of the plurality of pattern generators defining a different pattern/. Further, the pattern assembly can be further configured to enable positioning any of the plurality of pattern generators in the path of the laser light.

Yet another embodiment of the present invention can provide a landscape light including a first laser light source producing a first laser light having a first color, a second laser light source producing a second laser light having a second color, and a pattern generation assembly. The pattern generation assembly can include an interchangeable pattern generation module, and a pattern generation module mounting mechanism configured to releasably mount the interchangeable pattern generation module in a path of the first and second laser lights such that the laser lights passing through the interchangeable pattern generation module are projected onto a surface in a pattern defined by the at least one pattern generator. The landscape light can further include a spotlight producing a background light such that the laser light is projected substantially within the background light produced by the spotlight. The landscape light can also include a laser light effect assembly configured to produce at least one visual effect using the laser light. The visual effect can include at least one of a flashing effect, a pulsing effect, and a strobing effect.

According to other exemplary embodiments, the landscape light can include a wireless control module configured to provide wireless control of the landscape light, a timer configured to enable control of the landscape light based on operation of the timer, a speaker, and/or a motion sensor configured to enable control of the landscape light based on motion detected by the motion sensor

BRIEF DESCRIPTION OF THE DRAWINGS

The features and advantages of the present invention can be more readily understood from the following detailed description with reference to the accompanying drawings, wherein.

DETAILED DESCRIPTION

Figure 1:
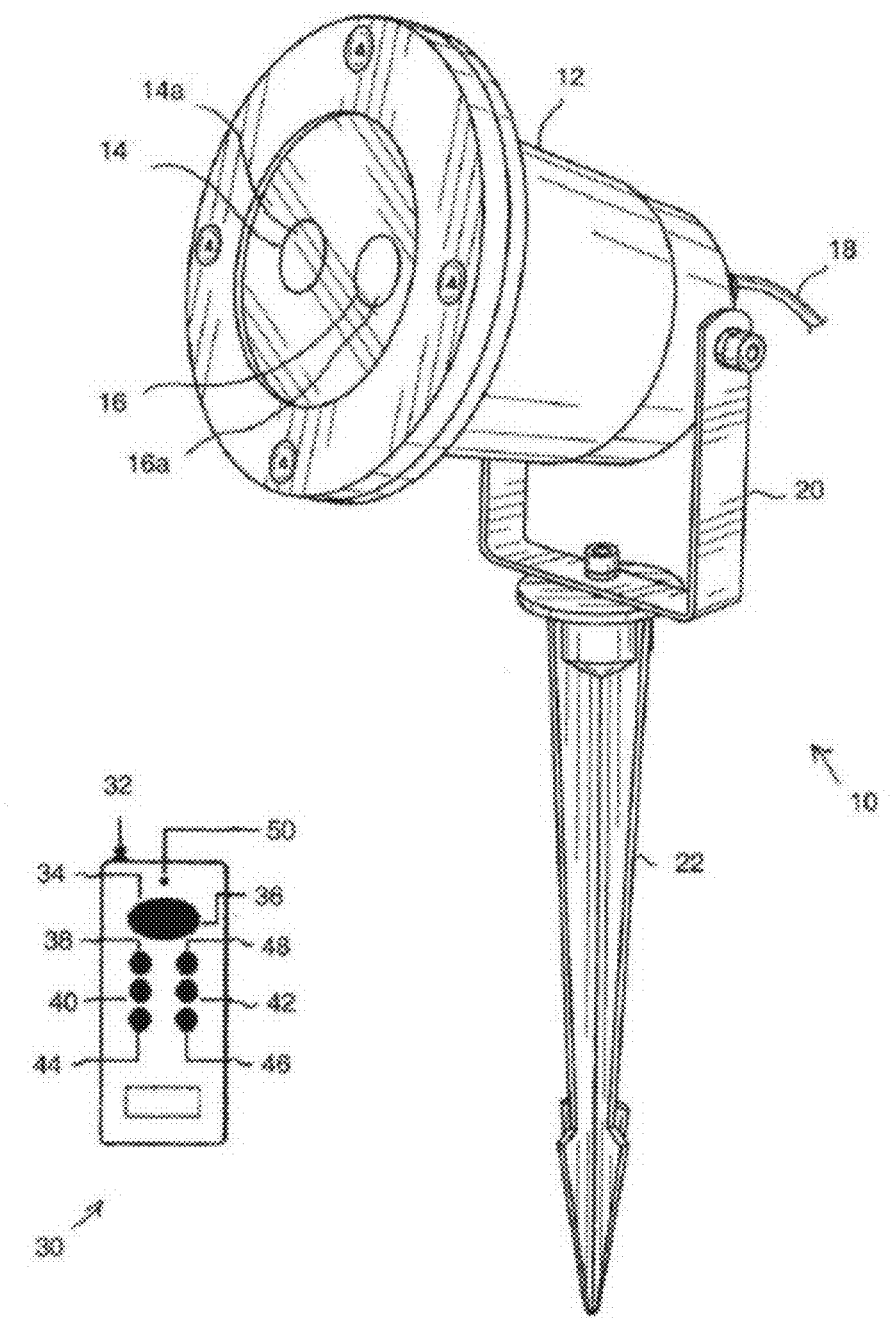
FIG. 1 is a front perspective view of a landscape light apparatus according to an embodiment of the present invention.

Embodiments of the present invention generally relate to a landscape light. Specifically, certain exemplary embodiments of the present invention provide various new and novel features for a landscape light, such as a landscape light having laser light sources. Landscape lights according to embodiments of the present invention can, for example, be used as interior or exterior festive and/or decorative lighting in connection with holidays such as Christmas, Halloween, etc. Additionally, the landscape lights according to embodiments of the present invention may be used in place of other traditional decorative lighting, such as string lights, etc. Although the embodiments of the present invention are primarily described with respect to a landscape light, it is not limited thereto, and it should be noted that the exemplary apparatus and systems described herein may be used in connection with any lighting apparatus FIG. 1 is an illustration of an exemplary landscape light 10 according to an embodiment of the present invention. As shown in FIG. 1, landscape light 10 can include light sources 14 and 16 and lenses 14a and 16a housed within light projector housing 12. Although landscape light 10 is shown in FIG. 1 having only two light source 14 and 16, landscape light 10 can include any number and type of light sources.

For example, landscape light 10 can include one, two, three, or more light sources. Further, each of the light sources can be any type of light source that can produce the type of light desired, such as, for example, light sources 14 and 16 may include lasers, incandescent bulbs, and/or light emitting diodes (LEDs). Optionally, light sources 14 and 16 can produce lights having the same color. Alternatively, light sources 14 and 16 can produce lights having different colors (e.g., red, green, white, blue, etc.). Further, as shown in FIG. 1, landscape light 10 can include lenses 14a and 16a, which can correspond to light sources 14 and 16, respectively. Lenses 14a and 16a can include any type of optical element that can manipulate and/or condition the light produced by light sources 14 and 16 in a desired manner. For example, lenses 14a and 16a can include diffractive features (e.g., diffractive holographic optics) configured to disperse the light generated by light sources 14 and 16 into a plurality of discrete points of light when projected onto a surface. Lenses 14a and 16a can also scatter the light generated by light sources 14 and 16 so as to lower the power of the light, thereby reducing the potential risk associated with exposure to the light in embodiments where light sources 14 and 16 may include lasers.

According to certain embodiments of the present invention, in operation, landscape light 10 can project light produced by light sources 14 and 16 onto a target surface. For example, light produced by light sources 14 and 16 may be manipulated or conditioned by lenses 14a and 16a and be projected onto a target surface, such as a wall or other structure. In an embodiment where lenses 14a and 16a include diffractive elements configured to disperse the light generated by light sources 14 and 16, landscape light may project a plurality of discrete points of light onto the target surface. Landscape light 10 may also include various modes of operation. For example, landscape light 10 may include mode where the lights produced by light sources 14 and 16 can be flashed, strobed, or pulsed at predetermined, or randomized intervals. This may be performed by modulating the power delivered to light sources 14 and 16 in accordance with the desired flashing, pulsing, or strobing pattern. Additionally, landscape light 10 may also a visual effect assembly, which can produce various visual effects using the lights produced by light sources 14 and 16. For example, visual effect assembly may be configured to produce a shimmering effect of the light, a movement of the light across the target surface, a "raining" effect of the light, etc. Visual effect assembly may also be configured to produce the flashing, pulsing, or strobing pattern of the light in addition to or in place of any power modulation techniques utilized to achieve these effects.

As shown in FIG. 1, landscape light 10 can also include mounting bracket 20, ground stake 22, and power cord 18. Power cord 18 can be connected to a power supply or transformer (not illustrated). Optionally, landscape light 10 can include a wireless remote control 30, which can enable wireless control of landscape light 10. As shown in FIG. 1, ground stake 22 and light projector housing 12 may be rotatably coupled to mounting bracket 20. This can allow user to aim and adjust the direction of the light produced by landscape light 10. For example, the angle of light projector housing 12 can be adjusted relative to mounting bracket 20, and mounting bracket 20 can be rotatably adjusted relative to ground stake 22. Thus, landscape light 10 can be adjusted in two degrees of freedom to provide nearly a full range of motion of adjustments. This can enable a user, for example, to adjust and aim the light produced by landscape light 10 to be projected on various targets even after it has been staked into the ground.

Additionally, landscape light 10 can include a wireless remote control 30 that can enable wireless operation of landscape light 10. For example, landscape light 10 can include a wireless transmitter/receiver, which can wirelessly communicate with a remote control 30 to enable wireless operation of landscape light 10. For example, the wireless transmitter/receiver can employ radio frequency ("RF"), Bluetooth, and/or WiFi technology to facilitate wireless communication between landscape light 10 and remote control 30. According to certain embodiments, landscape light 10 can be wirelessly operated via remote control 30. For example, remote control 30 can control powering landscape light 10 ON and/or OFF, changing the operation of light sources 14 and 16 (e.g., choosing between having one of light source 14 or 16 in an ON condition or having both light sources 14 and 16 in an ON condition), controlling a visual effect setting (e.g., flashing, movement, shimmering, strobing, etc.), controlling a timer setting, etc. Further remote control 30 can indicate and display the current operating status of landscape light 10 (e.g., whether or not landscape light 10 is ON or OFF and/or the mode of operation). According to certain embodiments, remote control 30 can be implemented via an app on a mobile device such as a smartphone or tablet, or via a web-based application on a computer.

Figure 2A:
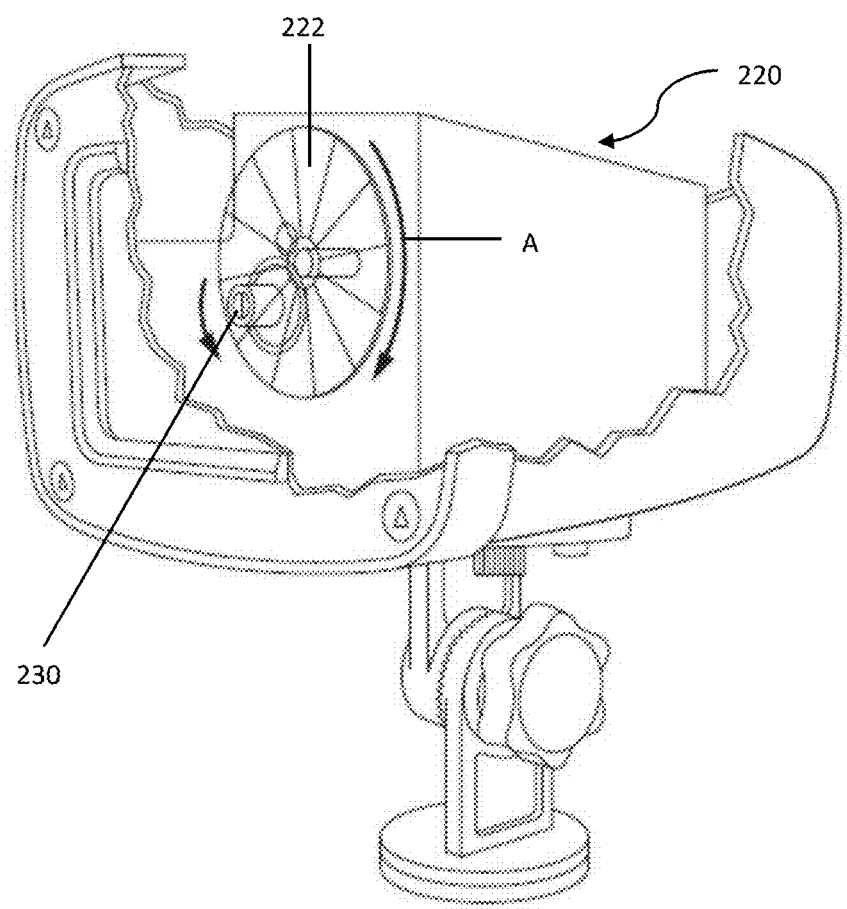
FIG. 2A is a front perspective cutaway view of a landscape light apparatus according to an embodiment of the present invention.
Figure 2B:
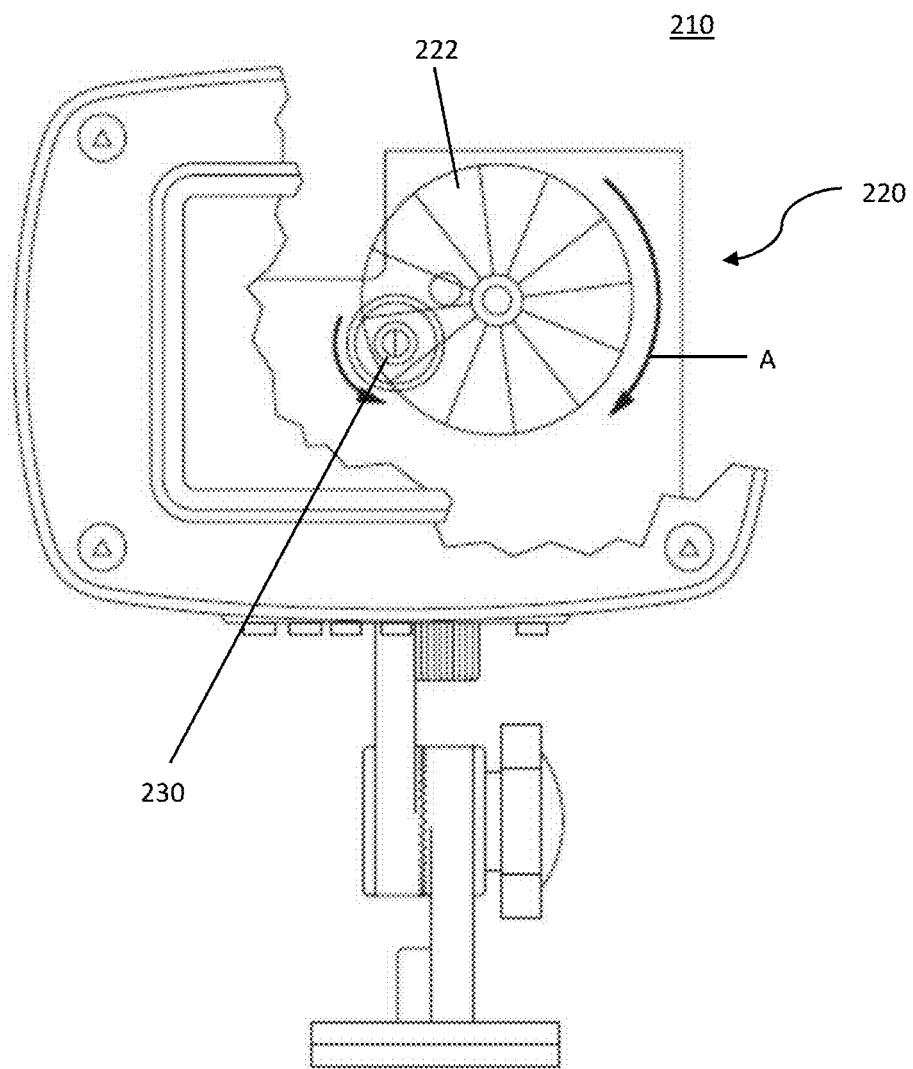
FIG. 2B is a front cutaway view of a landscape light apparatus according to an embodiment of the present invention.

FIGS. 2A and 2B show cut-away views of an exemplary landscape light 210 having a visual effect assembly 220 and light source 230 in accordance with an embodiment of the present invention. Landscape light 210 shown in FIGS. 2A and 2B operate similarly to landscape light 10 shown in FIG. 1. Further, visual effect assembly 220 can create and/or produce visual effects using the light generated by light source 230. For example, visual effect assembly 220 can create a flashing, pulsing, or strobing pattern, a shimmering effect, a movement of the light across the target surface, a "raining" effect, etc. According to certain exemplary embodiments, visual effect assembly 220 may include an optical element 222, which may include any optical features (e.g., holographic elements, diffractive elements, patterns, etc.) that can be used to create the desired visual effect. Further, optical element 222 may be coupled to a motor, or other articulating element, that can cause optical element 222 to be articulated in a defined manner, which when combined with the optical feature of optical element 222, can create the desired visual effect. As noted herein, visual effect assembly 220 can create a flashing, pulsing, or strobing pattern, a shimmering effect, a movement of the light across the target surface, a "raining" effect, etc. As shown in FIGS. 2A and 2B, optical element 222 may include a disk having optical features disposed thereon, which can be rotated in front of light source in the direction of arrow A to create various optical effects as the light generated by light source 230 interacts with rotating optical element 222. Although visual effect assembly 220 is shown to include a rotating optical wheel, visual effect assembly 220 can include any structure or programming that can enable creating the desired visual effects of the light.

Figure 3:
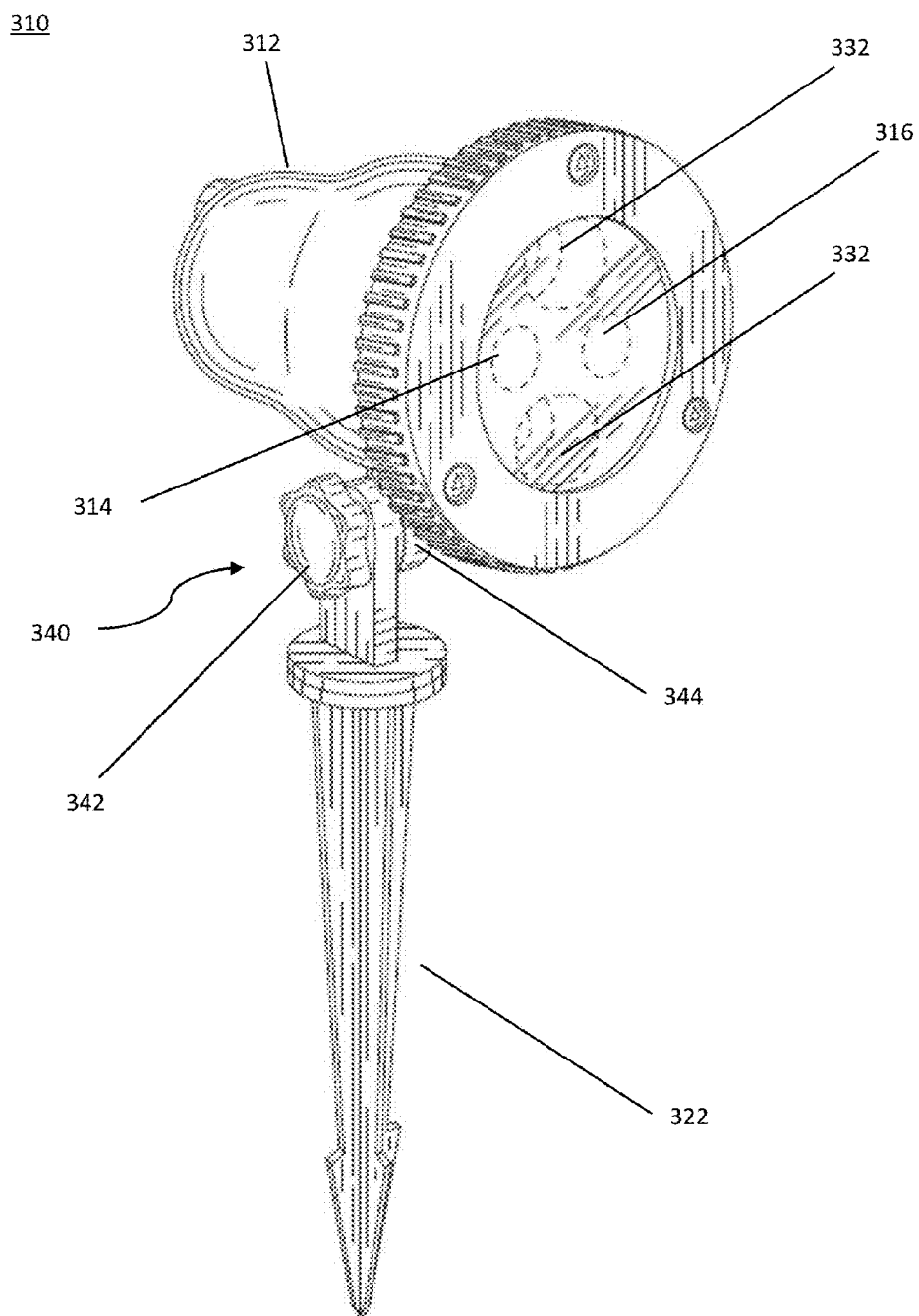
FIG. 3 is a front perspective view of a landscape light apparatus according to an embodiment of the present invention.

FIG. 3 shows an exemplary landscape light 310 according to an embodiment of the present invention. Similarly to landscape light 10 shown in FIG. 1, landscape light 310 includes housing 312, light sources 314 and 316, and ground stake 322. Additionally, landscape light 310 includes spotlights 332 and an adjustment mechanism 340. Spotlights 332 may include any type of light source having sufficient power to illuminate a desired area. For example, spotlights 332 may include light-emitting diodes (LED), halogen bulbs, high-intensity discharge gas lamps, etc., which may illuminate an area in which the light generated by light sources 314 and 316 are projected. For example, spotlights 332 may illuminate a surface such as a wall, and a plurality of discrete points of light generated by light sources 314 and 316 may be projected on the wall within the area of illumination. In operation, spotlights 332 may be configured to be operable in a continuously on state, a flashing mode of operation, varying levels of brightness/intensity, etc. Operation of the spotlights 332 can be in addition to and can augment any visual effects that can be produced/created as described herein. Further, certain visual effects (e.g., flashing, movement, etc.) can be implemented on the light generated by light sources 314 and 316 as well as the light generated by spotlights 332.

Further, as shown in FIG. 3, landscape light 310 can include adjustment mechanism 340. Adjustment mechanism 340 may include any element that facilitates adjustment of housing 312 relative to ground stake 322. As shown in FIG. 3, adjustment mechanism 340 may a securing element 342 and ratcheted teeth 344. Securing element 342 may enable housing 312 to be releasably secured in a plurality of positions relative to ground stake 322. Ratcheted teeth 344 may provide engagement mechanisms that define a plurality of positions in which housing 312 can be secured relative to ground stake 344.

Figure 4A:
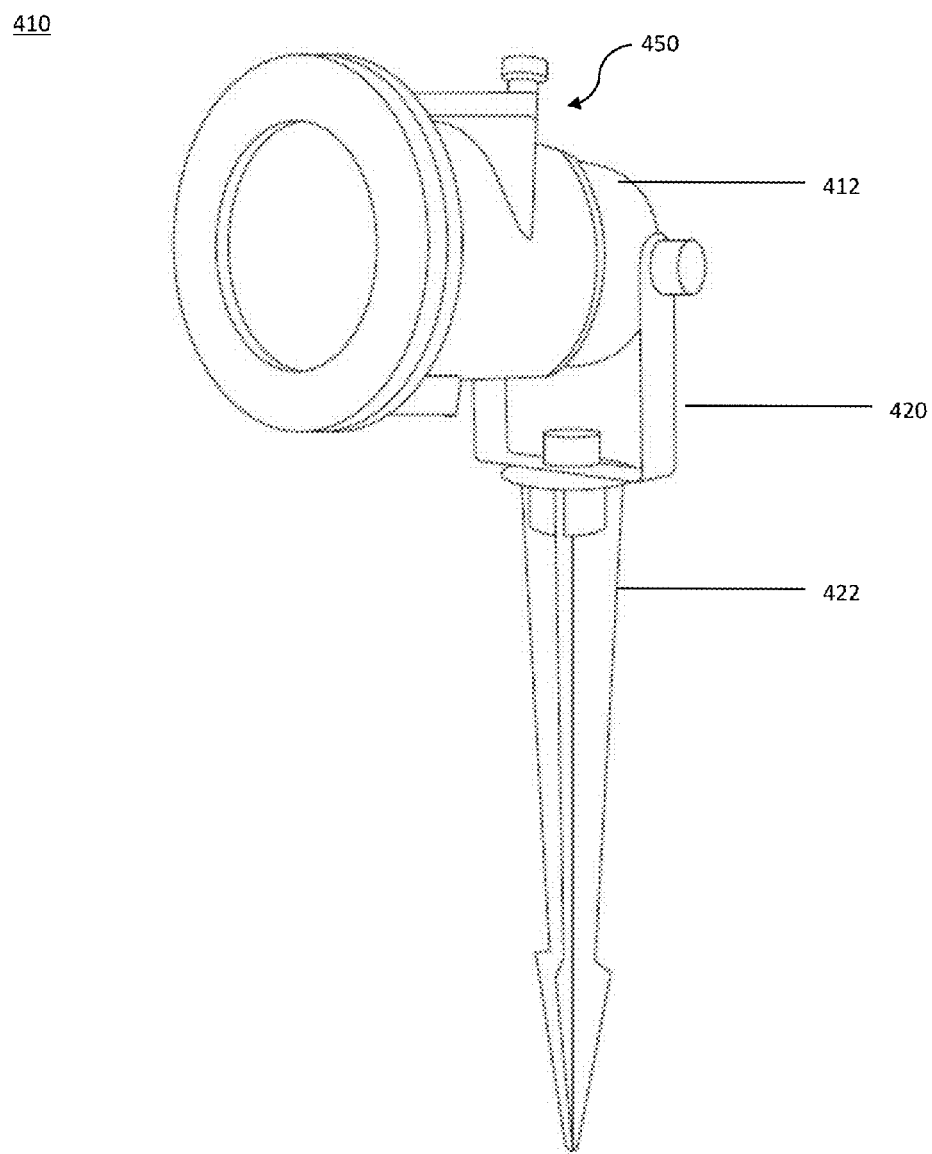
FIG. 4A is a front perspective view of a landscape light apparatus according to an embodiment of the present invention.
Figure 4B:
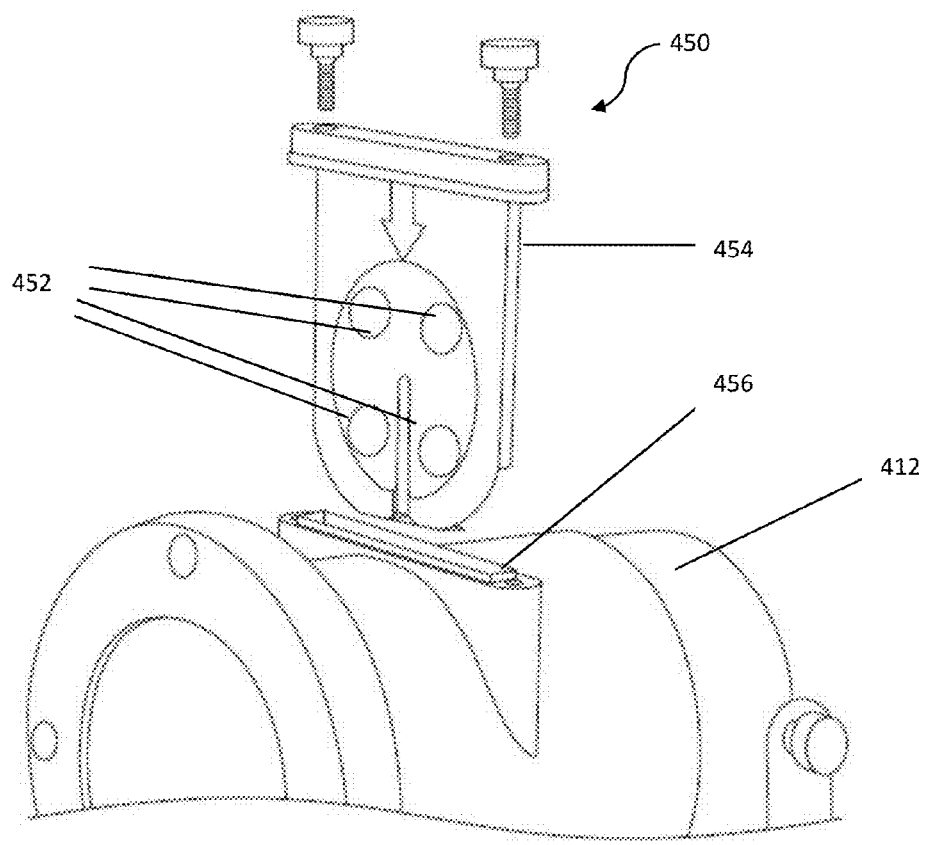
FIG. 4B is a front perspective detailed view of a landscape light apparatus according to an embodiment of the present invention.
Figure 4C:
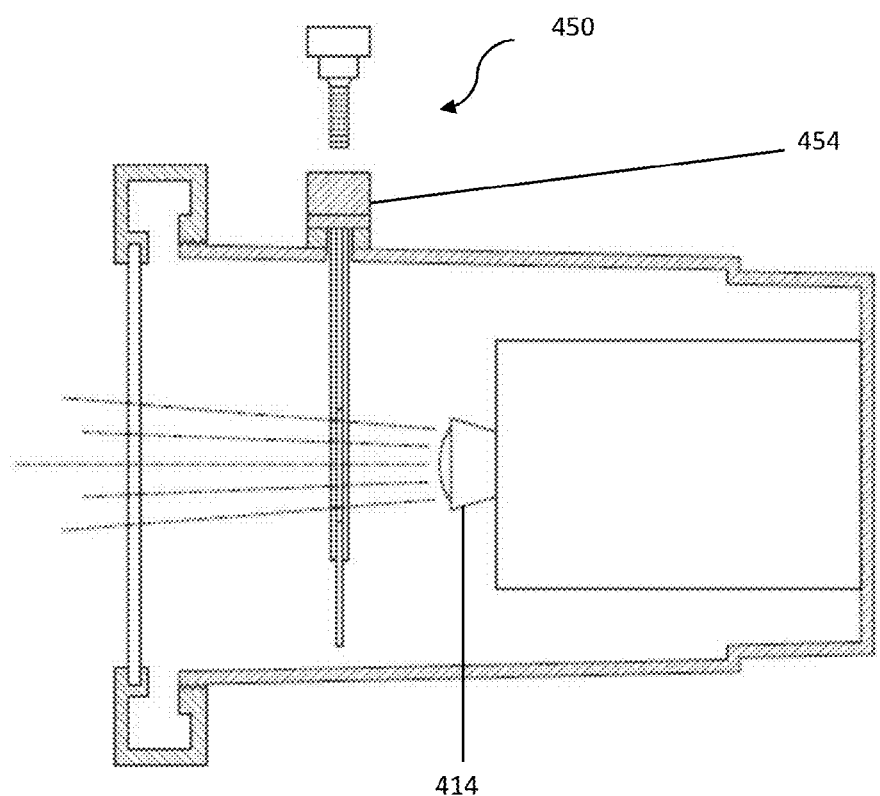
FIG. 4C is a cross-sectional view of a landscape light apparatus according to an embodiment of the present invention.

FIGS. 4A-4D show landscape lights 410 and 410a including pattern generation assemblies 450 and 450a, respectively, according to certain embodiments of the present invention. As shown in FIGS. 4A-4D, landscape lights 410 and 410a are similar to landscape light 10, but include pattern generation assemblies 450 and 450a. Pattern generation assemblies 450 and 450a can create patterns in the light produced by the light sources of landscape lights 410 and 410a, thereby enabling landscape lights 410 and 410a to be project light in specific patterns and shapes. For example, as shown in FIGS. 4A-4C, pattern generation assembly 450 may include pattern generators 452 mounted on a slide cartridge 454. Slide cartridge 454 may be configured to be received in cartridge receiving mount 456. Further, each of pattern generators may include a silhouette or outline of a specific pattern. Alternatively, pattern generators 452 can include any shape, pattern, or optical feature that can be used to obtain any desired visual effect. For example, pattern generators 452 can include shapes such as trees, hearts, angels, snowflakes, butterflies, bells, animals, balloons, jack-o-lanterns, etc. When slide cartridge is installed in housing 412 in receiving mount 456, slide cartridge 454 positions and secures at least one of pattern generators 452 in the path of the light generated by light sources of landscape light 410. According to certain exemplary embodiments, slide cartridge 454 may facilitate the mounting of a plurality of pattern generators 452 and slide cartridge 454 may allow a user to select between any of the pattern generators 452 mounted thereon. For example, each of pattern generators 452 may include a different pattern, and slide cartridge 454 and/or pattern generation assembly 450 may include a selector to rotate any of pattern generators 452 in position to be the active pattern generator.

As shown in FIG. 4C, when slide cartridge 454 is installed in housing 412 in receiving mount 456, light produced by light source 414 can pass through at least one of the pattern generators 452 mounted on slide cartridge 454. As light from light source 414 passes through pattern generators 452, the light may be shaped by the pattern defined by pattern generators 452. Further, slide cartridge 454 and/or pattern generation assembly 450 may include a selection mechanism so that any of pattern generators 452 can be positioned and secured in the path of the light produced by light source 414.

Figure 4D:
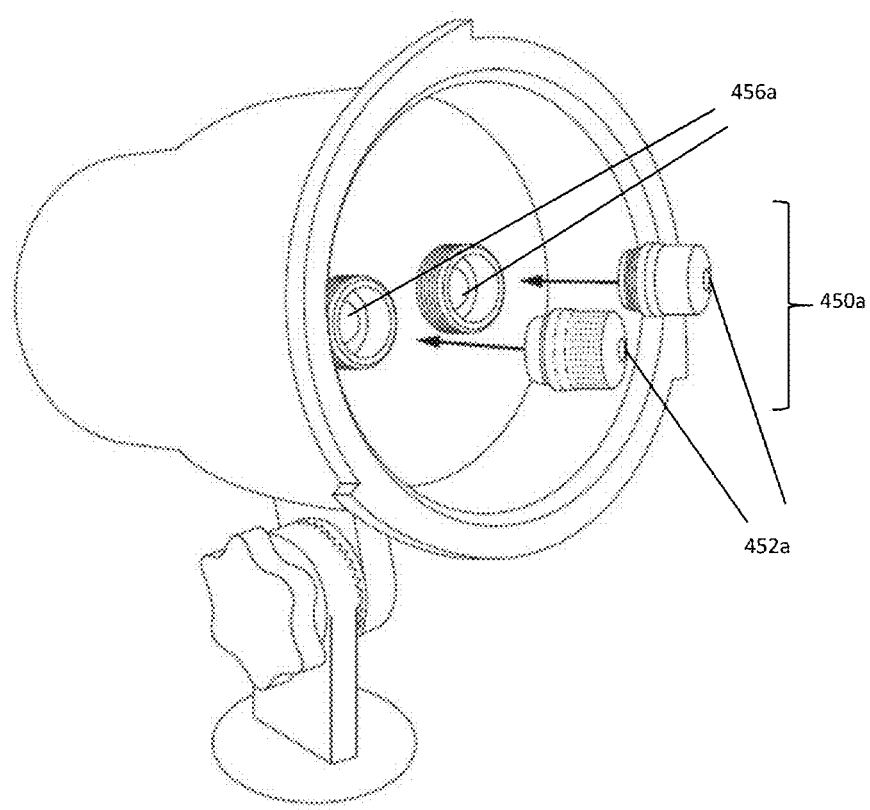
FIG. 4D is a front perspective partially opened view of a landscape light apparatus according to an embodiment of the present invention

FIG. 4D shows another exemplary landscape light 410a having pattern generation assembly 450a. As shown in FIG. 4D, pattern generation assembly 450a can include pattern generators 452a. Pattern generators 452a can be positioned in mounting locations 456a to secure pattern generators 452a in the path of the light generated by landscape light 410. For example, the mounting of pattern generators 452a may include a threaded engagement, a tension mount, a clip mount, or any other mounting mechanisms that can secure pattern generators 452a in the path of the light generated by landscape light 410a. Similar to landscape light 410, as the light generated by landscape light 410a passes through pattern generators 452a, pattern generators 452a can create patterns and shapes as defined by the patterns and/or shapes disposed thereon. Pattern generators 452a may include any shape, pattern, or optical feature that can be used to obtain any desired visual effect. For example, pattern generators 452 can include shapes such as trees, hearts, angels, snowflakes, butterflies, bells, animals, balloons, jack-o-lanterns, etc.

According to embodiments of the present invention, landscape light 10 can include various other features. For example, landscape light 10 can include a motion sensor to control operation of the light when motion is detected. Additionally, landscape light 10 can include a memory, which can facilitate programming various operating modes of landscape light 10. This programming can be performed via remote control 30. Landscape light 10 can further include a speaker, and music and audio can be stored on the memory, which can be played via the speaker. For example, landscape light can include holiday music, scary Halloween sounds, Christmas carols, etc. Further, the lights of landscape light 10 can be choreographed to the audio being played. Additionally, landscape light 10 can include a solar power module, enabling landscape light 10 to be powered by solar energy.

The embodiments and examples shown above are illustrative, and many variations can be introduced to them without departing from the spirit of the disclosure or from the scope of the appended claims. For example, elements and/or features of different illustrative and exemplary embodiments herein may be combined with each other and/or substituted with each other within the scope of the disclosure. For a better understanding of the disclosure, reference should be had to the accompanying drawings and descriptive matter in which there is illustrated exemplary embodiments of the present invention.

What is claimed as invention is:

1. A landscape light comprising:
   a first laser light source having a first lens and producing a first laser light having a first color, the first lens configured to disperse the first laser light;
   a second laser light source having a second lens and producing a second laser light having a second color, the second lens configured to disperse the second laser light; and
   a spotlight producing a background light such that the dispersed first and second laser lights are projected substantially within the background light produced by the spotlight.

2. The landscape light of claim 1, further comprising a third laser light source producing a third laser light.

3. The landscape light of claim 1, wherein the third laser light has a third color, the first, second, and third colors being different.

4. The landscape light of claim 1, further comprising a laser light effect assembly configured to produce at least one visual effect using at least one of the first and the second laser lights.

5. The landscape light of claim 4, wherein the visual effect includes at least one of a shimmering effect, a flashing effect, a pulsing effect, a strobing effect, a movement, and a pattern.

6. The landscape light of claim 1, further comprising a wireless control module configured to provide wireless control of the landscape light.

7. The landscape light of claim 1, further comprising a timer, the timer configured to enable control of the landscape light based on operation of the timer.

8. The landscape light of claim 1, further comprising a speaker.

9. The landscape light of claim 1, further comprising a motion sensor, the motion sensor configured to enable control of the landscape light based on motion detected by the motion sensor.

10. A landscape light comprising:
    a first laser light source producing a first laser light having a first color;
    a second laser light source producing a second laser light having a second color; and
    a pattern generation assembly including:
      an interchangeable pattern generation module, and
      a pattern generation module mounting mechanism configured to releasably mount the interchangeable pattern generation module in a path of the first and second laser lights such that the laser lights passing through the interchangeable pattern generation module are projected onto a surface in a pattern defined by the interchangeable pattern generation module.

11. The landscape light of claim 10, further comprising a spotlight producing a background light such that the laser light is projected substantially within the background light produced by the spotlight.

12. The landscape light of claim 10, further comprising a laser light effect assembly configured to produce at least one visual effect using the laser light.

13. The landscape light of claim 12, wherein the visual effect includes at least one of a flashing effect, a pulsing effect, and a strobing effect.

14. The landscape light of claim 10, further comprising a wireless control module configured to provide wireless control of the landscape light.

15. The landscape light of claim 10, further comprising a timer, the timer configured to enable control of the landscape light based on operation of the timer.

16. The landscape light of claim 10, further comprising a speaker.

17. The landscape light of claim 10, further comprising a motion sensor, the motion sensor configured to enable control of the landscape light based on motion detected by the motion sensor.

18. A landscape light comprising:
    a first light-emitting diode (LED) light source producing a first LED light having a first color;
    a second LED light source producing a second LED light having a second color; and
    a pattern generation assembly including:
      an interchangeable pattern generation module, and
      a pattern generation module mounting mechanism configured to releasably mount the interchangeable pattern generation module in a path of the first and second LED lights such that the LED lights passing through the interchangeable pattern generation module are projected onto a surface in a pattern defined by the interchangeable pattern generation module.

19. The landscape light of claim 18, further comprising a LED light effect assembly configured to produce at least one visual effect using the LED light.

20. The landscape light of claim 19, wherein the visual effect includes at least one of a flashing effect, a pulsing effect, and a strobing effect.

21. The landscape light of claim 18, further comprising a wireless control module configured to provide wireless control of the landscape light.

22. The landscape light of claim 18, further comprising a timer, the timer configured to enable control of the landscape light based on operation of the timer.

23. The landscape light of claim 18, further comprising a speaker.

24. The landscape light of claim 18, further comprising a motion sensor, the motion sensor configured to enable control of the landscape light based on motion detected by the motion sensor.

25. The landscape light of claim 18, wherein the pattern generation module mounting mechanism includes a removably mountable slide cartridge mechanism.

26. The landscape light of claim 18, further comprising a motion assembly configured to impart movement to the light passing through the interchangeable pattern generation module such that the LED lights move on the surface.

* * * * *

EX PARTE REEXAMINATION CERTIFICATE (11626th)

United States Patent
Lentine

(10) Number: US 9,869,459 C1
(45) Certificate Issued: Jan. 14, 2020

(54) LANDSCAPE LIGHT

(71) Applicant: Telebrands Corp., Fairfield, NJ (US)

(72) Inventor: Lou Lentine, Chattanooga, TN (US)

(73) Assignee: TELEBRANDS CORP., Fairfield, NJ (US)

Reexamination Request:
No. 90/014,067, Jan. 16, 2018

Reexamination Certificate for:
Patent No.: 9,869,459
Issued: Jan. 16, 2018
Appl. No.: 15/280,315
Filed: Sep. 29, 2016

Related U.S. Application Data

(63) Continuation-in-part of application No. 15/142,789, filed on Apr. 29, 2016, which is a continuation of application No. 14/801,458, filed on Jul. 16, 2015, now abandoned.

(60) Provisional application No. 62/025,344, filed on Jul. 6, 2014.

(51) Int. Cl.
| | | |
|---|---|---|
| *F21V 21/08* | (2006.01) |
| *F21V 23/00* | (2015.01) |
| *G02B 5/02* | (2006.01) |
| *H05B 37/02* | (2006.01) |
| *F21V 5/04* | (2006.01) |
| *F21S 10/06* | (2006.01) |
| *F21V 21/30* | (2006.01) |
| *F21S 10/02* | (2006.01) |
| *F21S 9/03* | (2006.01) |
| *F21S 10/00* | (2006.01) |
| *F21V 23/04* | (2006.01) |
| *F21V 33/00* | (2006.01) |
| *F21W 131/10* | (2006.01) |
| *F21W 131/109* | (2006.01) |
| *F21Y 113/13* | (2016.01) |

(52) U.S. Cl.
CPC .......... *F21V 21/0824* (2013.01); *F21S 10/06* (2013.01); *F21V 5/04* (2013.01); *F21V 21/30* (2013.01); *F21V 23/001* (2013.01); *F21V 23/0407* (2013.01); *G02B 5/0252* (2013.01); *H05B 37/0281* (2013.01); *F21S 9/03* (2013.01); *F21S 10/007* (2013.01); *F21S 10/023* (2013.01); *F21V 23/0435* (2013.01); *F21V 23/0471* (2013.01); *F21W 2131/10* (2013.01); *F21W 2131/109* (2013.01); *F21Y 2113/13* (2016.08)

(58) Field of Classification Search
None
See application file for complete search history.

(56) References Cited

To view the complete listing of prior art documents cited during the proceeding for Reexamination Control Number 90/014,067, please refer to the USPTO's public Patent Application Information Retrieval (PAIR) system under the Display References tab.

*Primary Examiner* — Deandra M Hughes

(57) ABSTRACT

A landscape light including a first laser light source having a first lens and producing a first laser light having a first color, the first lens configured to disperse the first laser light, a second laser light source having a second lens and producing a second laser light having a second color, the second lens configured to disperse the second laser light, and a spotlight producing a background light such that the dispersed first and second laser lights are projected substantially within the background light produced by the spotlight.

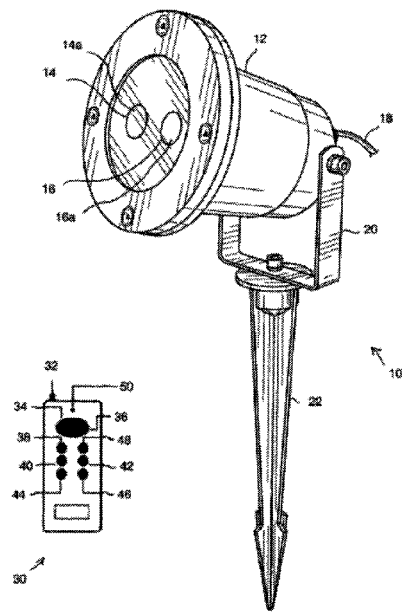

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 18-26 are cancelled.

Claims 1-17 were not reexamined.

\* \* \* \* \*